H. E. WHITING.
AIR PURIFYING DEVICE FOR INTERNAL COMBUSTION ENGINES.
APPLICATION FILED MAY 4, 1910.
1,005,386.
Patented Oct. 10, 1911.
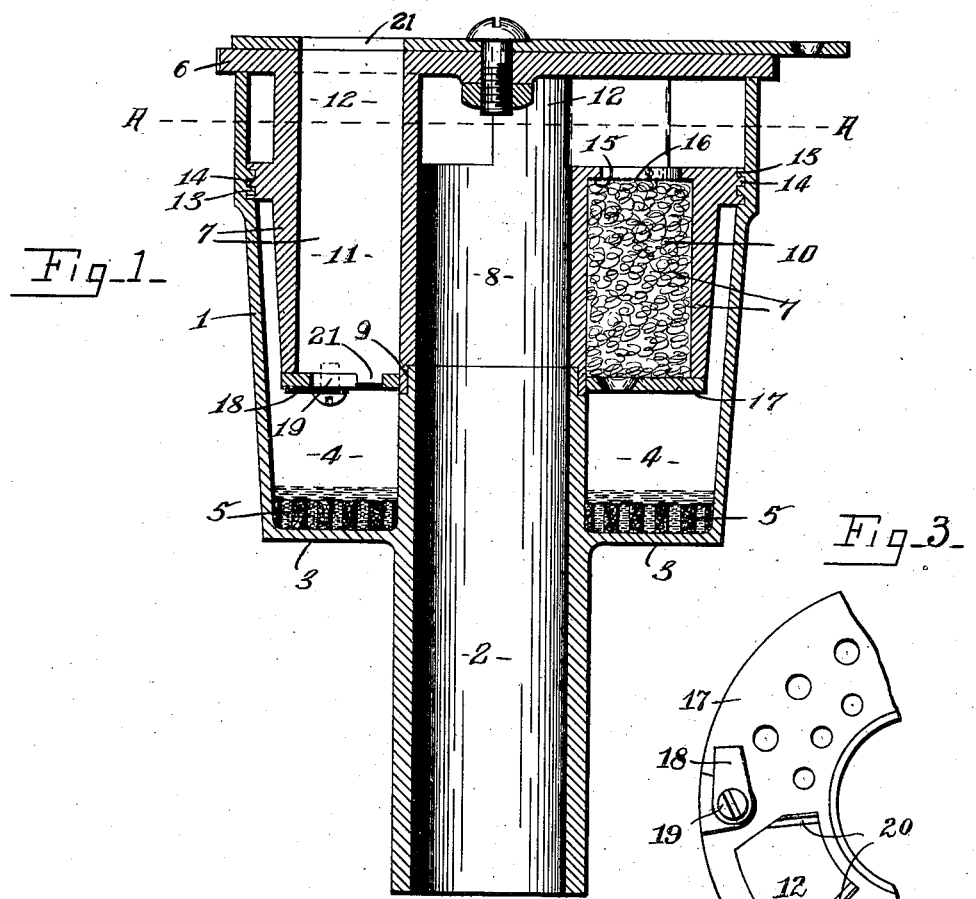
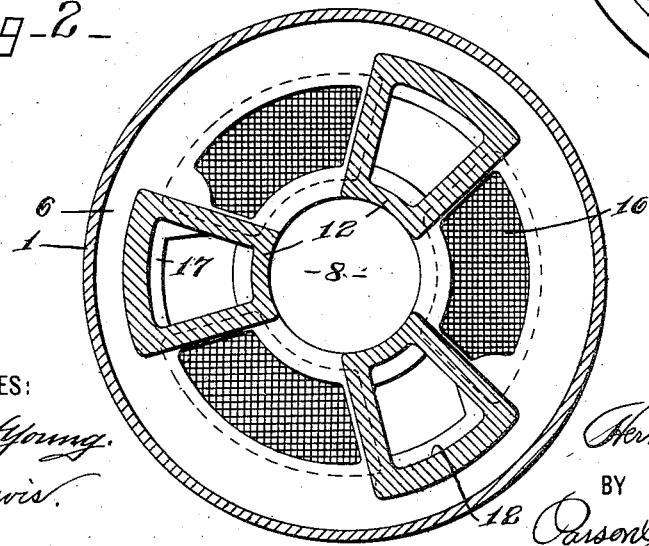
WITNESSES:
Chas. F. Young.
S. Davis.
INVENTOR
Herman E. Whiting
BY
Parsons Hall Bodeer
ATTORNEYS

UNITED STATES PATENT OFFICE.

HERMAN E. WHITING, OF PALMYRA, NEW YORK, ASSIGNOR TO GARLOCK AUTO SPECIALTY COMPANY, OF PALMYRA, NEW YORK, A CORPORATION OF NEW YORK.

AIR-PURIFYING DEVICE FOR INTERNAL-COMBUSTION ENGINES.

1,005,386.

Specification of Letters Patent.   Patented Oct. 10, 1911.

Application filed May 4, 1910.   Serial No. 559,293.

*To all whom it may concern:*

Be it known that I, HERMAN E. WHITING, of Palmyra, in the county of Wayne and State of New York, have invented a certain new and useful Air-Purifying Device for Internal-Combustion Engines, of which the following is a specification.

My invention has for its object a particularly simple and efficient air purifying device for internal combustion engines, and it consists in the combinations and constructions hereinafter set forth and claimed.

In describing this invention, reference is had to the accompanying drawing, in which like characters designate corresponding parts in all the views.

Figure 1 is a vertical section of my air purifying device. Fig. 2 is a horizontal section on line A—A, Fig. 1. Fig. 3 is a detail view showing the manner of securing the bottom plate of the filtering element.

This air purifying device comprises a receptacle having an inlet and an outlet for the air, and a filtering element detachably secured in the receptacle and having passages communicating with the inlet and the outlet.

1 is the receptacle having its upper side open, the receptacle also having an integral outlet conduit 2 at its bottom 3 or side opposite the open side thereof, said conduit 2 projecting axially in opposite directions from the bottom 3 and the part thereof extending into the receptacle, forming together with the bottom 3 and the lower portions of the side walls of the receptacle, a chamber 4 in which is located a liquid for catching dust, or other foreign matter in the incoming air, and for supplying moisture to the air. Usually, a pad 5 is located in the chamber 4 for retaining such liquid. This liquid is usually water, or a mixture of water and some viscous fluid.

6 is a cover for the open side of the receptacle, and 7 is a filtering element integral with the cover, said element comprising a body spaced apart from the cover and having a central conduit 8 alined with the outlet conduit 2 and coupled thereto by a lapping or interlocking joint 9, the conduit 8 opening through the top of the body. Said body is also formed with filtering chambers 10 opening through its top and communicating at their lower or inner ends with the chamber 4 of the receptacle, the filtering chambers being spaced equidistant apart about the axis of the central conduit 8, the spaces between the filtering chambers forming air inlet passages 11 which communicate with the outer air through conduits 12 rising from the top of the body and registering with the passages 11 and opening through the cover 6. The side walls of the filtering chambers are usually radial to the axis of the central conduit 8. The cover 6, conduits 12, and body of the filtering element 7 are formed integral and constitute a unit which is removable for the purpose of cleaning, etc.

Preferably, the receptacle 1 is formed with internal threads 13, and the body of the filtering element 7 is formed with peripheral threads 14 engaging the former threads, and the margin of the cover overlaps the edge of the receptacle around the open side. Preferably, the walls of the filtering chambers 10 are restricted at the tops thereof, forming shoulders 15 against which screens 16 abut which retain the filtering material, as wool, asbestos, and the like, within the chambers. Such material is prevented from falling from the chambers 10 into the chamber 4 by means of a perforated plate 17 detachably secured to the inner end of the body 9 and forming the bottom thereof, said plate having openings registering with the passages 11 and the perforated portions thereof extending across the lower or inner ends of the chambers 10.

The plate 17 is held in position by means of catch, as the catch 18 carried by the body and here shown as pivoted at 19 thereto and movable on its pivot over the lower face of the plate. Usually, for the purpose of positioning and facilitating the retaining of the plate 17 in position, the walls of the passages 11 are provided with extensions or flanges at their lower ends which engage the side walls of the openings of said plate and tend to center or guide the plate into its operative position. One of such flanges is shown at 20, Fig. 2. A suitable register 21 is carried by the cover for opening and closing the conduits 12.

In operation, the outlet 2 of the receptacle 1 is suitably coupled to the pipe leading to the carbureter, and during the suction stroke of the piston of the engine to which the carbureter is attached, air passes through the passages 11 to the catching chamber 4, where it impinges the water or other fluid held by the pad therein, then upwardly through the plate 17 and filtering chambers 10, and through the top of the body of the filtering element, whence it passes into the central conduit 8, outlet conduit 2, and to the carbureter.

What I claim, is:—

1. An air purifying device comprising a liquid receptacle having an outlet conduit, and a filtering element removably supported by said liquid receptacle and having an unrestricted discharge conduit extending therethrough and connecting with the conduit of the liquid receptacle above the liquid level of the latter.

2. An air purifying device comprising a liquid receptacle having an outlet conduit projecting upwardly within the receptacle from the bottom thereof, and a filtering element removably supported by the receptacle and having a downwardly discharging unrestricted conduit extending therethrough and communicating with the outlet conduit.

3. An air purifying device comprising a receptacle having an outlet conduit projecting upwardly from the bottom thereof and within the receptacle, and a filtering element supported by said body and having an unrestricted air inlet conduit leading downwardly therethrough to the receptacle, filtering material receiving the air from the receptacle and an unrestricted conduit receiving air passed through the filtering material, extending through the filtering material and arranged to connect with the outlet conduit of the receptacle.

4. An air purifying device comprising a receptacle having an outlet conduit projecting upwardly from the bottom in the interior of the receptacle, and a filtering element removably supported by the receptacle and having a downwardly discharging conduit telescoping with the outlet conduit of the receptacle.

5. An air purifying device comprising a liquid receptacle having a centrally arranged outlet conduit and a filtering element having a centrally arranged discharge conduit coöperating with the receptacle outlet, one of said elements fitting within the other and having external threads and the other having internal threads engaging the external threads of the other to form an air tight joint between the parts, the parts being engaged and disengaged by a rotary movement about an axis extending centrally through the outlet conduit and the discharge conduit so that these parts maintain their relation and form a tight joint between them.

6. An air purifying device comprising a liquid receptacle having a centrally arranged outlet conduit, and a filtering element having a discharging conduit telescoping with the receptacle conduit above the liquid level of the liquid receptacle, the receptacle and the filtering element having screw threaded connection forming an air tight joint between them, and, to make and break the connection, being rotatable about an axis extending centrally through the outlet and the discharge conduit so that these parts maintain their relation for any relative position of the receptacle and the discharge conduit.

7. An air purifying device for internal combustion engines comprising a receptacle having an opening in one side and an outlet in another side thereof, and a cover for the opening, and a filtering element comprising a body located within the receptacle and spaced apart from the cover, the body having an outlet conduit opening through its top and bottom and communicating with the outlet of the receptacle, and a filtering chamber opening through the top and bottom of the body and communicating at its inner end with the interior of the receptacle, the body also having an inlet passage opening through the bottom thereof and communicating at its inner end with the interior of the receptacle, and conduits projecting from the top of the body and registering with the inlet passage and opening through the cover, said cover, body and conduits being integral, substantially as and for the purpose described.

8. An air purifying device for internal combustion engines comprising a receptacle having an opening in one side and an outlet in another side thereof, and a cover for the opening, and a filtering element comprising a body located within the receptacle and spaced apart from the cover and having a central outlet conduit opening through its top and bottom and communicating with the outlet of the receptacle, and filtering chambers opening through the top and bottom of said element and spaced apart around the central conduit, the chambers communicating at their inner ends with the interior of the receptacle and having their side walls arranged radially to the axis of the central conduit, the spaces within the body between the chambers forming inlet passages opening through the bottom of the body and communicating at their inner ends with the interior of the receptacle, and conduits projecting from the top of the body and registering with the inlet passages and opening through the cover, said cover, body and conduits being integral, substantially as and for the purpose specified.

9. An air purifying device for internal combustion engines comprising a receptacle having a threaded opening at one side thereof and an outlet in another side thereof, and a cover for the opening, and a filtering element comprising a body located within the receptacle and spaced apart from the cover and having an outlet conduit opening through its top and bottom and communicating with the outlet of the receptacle, and filtering chambers opening through the top and bottom of the body and communicating at their inner ends with the interior of the receptacle, the body also having inlet passages opening through the bottom thereof and communicating at their inner ends with the interior of the receptacle, and conduits projecting from the top of the body and registering with the inlet passages of the body and opening through the cover, said cover, body and conduits being integral, and the body being formed with threads turning in the threads of the receptacle, substantially as and for the purpose set forth.

10. An air purifying device for internal combustion engines comprising a receptacle having a threaded opening in one side thereof and an outlet in another side thereof, and a cover for the opening, the margin of the cover lapping the edge of the receptacle around said opening, and a filtering element comprising a body located within the receptacle and spaced apart from the cover, the body having an outlet conduit opening through its top and bottom and communicating with the outlet of the receptacle, and filtering chambers opening through the top and bottom of the body and communicating at their inner ends with the interior of the receptacle, the body also having inlet passages opening through the bottom thereof and communicating with their inner ends with the interior of the receptacle, and conduits rising from the top of the body and registering with the inlet passages and opening through the cover, said cover, body and conduits being integral, and the body being formed with threads turning in the threads of the receptacle, substantially as and for the purpose described.

11. An air purifying device for internal combustion engines comprising a receptacle having a threaded opening in one side and an outlet in another side thereof, and a cover for the opening, the margin of the cover lapping the outer edge of the receptacle around said opening, and a filtering element comprising a body located within the receptacle, the body having filtering chambers opening through the top and bottom of the body and spaced apart around the central conduit and having the side walls thereof arranged radially to the axis of the central conduit, the chambers communicating at their inner ends with the interior of the receptacle, and the spaces within the body between the chambers forming inlet passages communicating at their inner ends with the interior of the receptacle, and conduits projecting from the top of the body and registering with the inlet passages, said conduits opening through the cover, said cover, body and conduits being integral, and the body having threads for engaging the threads of the recpetacle, substantially as and for the purpose specified.

12. An air purifying device for internal combustion engines comprising a receptacle having an opening in one side thereof and an outlet at another side thereof, and a cover for the opening, and a filtering element located within the receptacle and comprising a body spaced apart from the cover and the bottom of the receptacle, the body having an outlet conduit opening through its top and bottom and communicating with the outlet of the receptacle, a filtering chamber opening through the top and bottom of the body and communicating at its inner end with the interior of the receptacle, the walls of the chamber being provided with inwardly projecting shoulders at their outer ends, and the body also having an inlet passage opening through the bottom thereof and communicating at its inner end with the interior of the receptacle, and a conduit rising from the top of the body and alined with the inlet passage of the body and opening through the cover, and a screen located within the filtering chamber and abutting against said shoulders, substantially as and for the purpose specified.

13. An air purifying device for internal combustion engines comprising a receptacle having an opening in the top thereof, and an outlet conduit projecting axially into the receptacle from the bottom of said receptacle and forming a chamber in the lower portion of the receptacle, and a cover for the open top, and a filtering element comprising a body located within the receptacle and spaced apart from the cover, the body having an outlet conduit alined with the outlet conduit of the receptacle and being coupled with the inner end thereof, the outlet conduit of the body opening through the top thereof, the body also having a filtering chamber opening through its top and bottom and an inlet passage opening through its bottom, and conduits rising from the top thereof and registering with the inlet passage and opening through the cover, substantially as and for the purpose set forth.

14. An air purifying device for internal combustion engines comprising a receptacle having an opening in one side thereof, and an outlet in another side thereof, a filtering element comprising a body located within the receptacle and terminating short of the bottom thereof, the body having inlet passages opening through the bottom thereof into the receptacle, the passages also communicating with the outer air, an outlet passage opening through the bottom of said body and being coupled with the outlet of the receptacle, and a filtering chamber communicating at its top with the outlet conduit, a perforated plate at the inner end of the body and having passages alined with said inlet passages, the perforated portions of the plate extending across the inner end of the filtering chamber, and catches for holding said plate in position, substantially as and for the purpose specified.

15. An air purifying device for internal combustion engines comprising a receptacle having a threaded opening in one side thereof, and an outlet conduit at the opposite side thereof, the outlet conduit extending inwardly toward said opening and together with the bottom and lower portions of the sides of the receptacle forming a chamber, and a cover for the opening, the margin of the cover lapping the edge of the receptacle around said opening, and a filtering element comprising a body located within the receptacle and spaced apart from the cover, the body having a central outlet conduit opening through its top and bottom and coupled to and alined with the outlet conduit of the receptacle, the body also having filtering chambers opening through the top of said element and spaced apart around the central conduit and having the side walls thereof arranged radially to the axis of the central conduit, the lower ends of such walls being provided with extensions forming flanges, the spaces within the body between the chambers forming inlet passages, conduits rising from the top of the body and registering with the inlet passages and opening through the cover, a perforated plate at the inner end of the body, the plate being formed with openings registering with said inlet passages, the openings receiving said flanges, and the perforated portions of the plate extending across the inner ends of the filtering chambers, and catches for holding the bottom plate in position, substantially as and for the purpose set forth.

In testimony whereof, I have hereunto signed my name in the presence of two attesting witnesses, at Palmyra, in the county of Wayne, in the State of New York, this 13th day of January, 1910.

HERMAN E. WHITING.

Witnesses:
   WINSTON GHEACH,
   G. E. BERNHARD.